(12) United States Patent
Scura et al.

(10) Patent No.: US 7,876,532 B2
(45) Date of Patent: Jan. 25, 2011

(54) LOW-PROFILE ROTARY MOTOR WITH FIXED BACK IRON

(75) Inventors: John E. Scura, Paso Robles, CA (US); John Beley, Moorpark, CA (US); David Chew, San Jose, CA (US); Wendy Lorimer, San Jose, CA (US); Babu Rahman, Fremont, CA (US); Frank Ivan Morris, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 980 days.

(21) Appl. No.: 11/688,405

(22) Filed: Mar. 20, 2007
(Under 37 CFR 1.47)

(65) Prior Publication Data

US 2007/0159728 A1    Jul. 12, 2007

Related U.S. Application Data

(63) Continuation-in-part of application No. 11/326,788, filed on Jan. 6, 2006, now abandoned.

(60) Provisional application No. 60/642,184, filed on Jan. 7, 2005.

(51) Int. Cl.
*G11B 5/55* (2006.01)
(52) U.S. Cl. .................................................. 360/264.7

(58) Field of Classification Search ............... 360/264.7, 360/264.8, 264.9, 265, 265.2, 265.3, 265.6, 360/265.7, 265.8, 266.4, 266.5, 266.7, 266.8, 360/266.9, 78.12; 310/12.08, 12.24, 15, 310/17, 21, 36, 156.01, 13, 16
See application file for complete search history.

(56) References Cited

U.S. PATENT DOCUMENTS

| | | | | |
|---|---|---|---|---|
| 4,475,185 A | * | 10/1984 | Fujio et al. | 369/265 |
| 4,490,635 A | * | 12/1984 | Harrison et al. | 310/38 |
| 4,775,908 A | * | 10/1988 | Ycas | 360/264.9 |
| 5,041,935 A | * | 8/1991 | Aruga et al. | 360/264.9 |
| 5,247,410 A | * | 9/1993 | Ebihara et al. | 360/264.9 |
| 5,491,598 A | * | 2/1996 | Stricklin et al. | 360/265.6 |
| 5,557,152 A | * | 9/1996 | Gauthier | 310/46 |

* cited by examiner

*Primary Examiner*—Craig A. Renner
*Assistant Examiner*—Tamara Ashford
(74) *Attorney, Agent, or Firm*—Fellers, Snider, et al.

(57) ABSTRACT

A rotary actuator motor is provided including a stationary coil section and a rotating magnet. The magnet is incorporated with the pivot bearing assembly, and the coil section is aligned with the magnet along an axis of rotation of the actuator. The magnet fully encircles the axis of rotation. The coil comprises one or more closed loops of electrically conductive material. The motor in this arrangement maintains a much smaller profile in comparison to a traditional voice coil motor that is mounted to a yoke extending away from the axis of rotation of the actuator.

6 Claims, 7 Drawing Sheets

LOW-PROFILE ROTARY MOTOR WITH FIXED BACK IRON

CROSS REFERENCE TO RELATED APPLICATION

This application is a continuation-in-part application of U.S. application Ser. No. 11/326,788, filed on Jan. 6, 2006, entitled "Rotary Actuator Motor for Disk Drive", which claims priority from U.S. Provisional Patent Application No. 60/642,184 filed on Jan. 7, 2005, entitled "Disk Drive Form Factor Enabling Rotary Magnet Pure Torque Actuator Motor," the disclosures of which are incorporated herein by reference in their entirety.

FIELD OF THE INVENTION

The present invention relates to disk drives, and more particularly, to a rotary actuator motor used to control movement of an actuator assembly in a disk drive.

BACKGROUND OF THE INVENTION

Disk drives generally utilize rotary actuators to position one or more magnetic read/write heads (also known as transducers), with respect to a similar number of magnetic disks rotatably mounted on a hub driven by a motor. The read/write heads are moved across selected tracks of the magnetic disks to gain access to the digital information recorded on the tracks and/or to write data to particular locations on the tracks. The read/write heads are mounted on an air bearing slider. The slider positions the read/write heads above the data surface of the corresponding disk by a cushion of air generated by the rotating disk. Alternatively, the slider may operate in contact with the surface of the disk. The slider is mounted to a suspension load beam. The suspension maintains the read/write heads and the slider adjacent to or in contact with the data surface of the disk.

The suspension is connected to the distal end of an actuator arm that is pivotally installed within the housing of the disk drive. Typically, the actuator arm is mounted to a pivot bearing assembly that allows the actuator arm to rotate or pivot in response to torques generated by a voice coil motor mounted to the yoke portion of the actuator arm.

The voice coil is integrated within a closed loop feedback system or servo system to dynamically position the heads directly over the desired data tracks. The principle of operation for the voice coil motor is controlled electromagnetic interaction between a coil and a permanent magnet. The voice coil typically includes a bundle of wires or coils that are mounted to the yoke arms that extend away from the central pivot axis of the actuator. The coil is immersed in an axially oriented bi-polar magnetic field generated by one or more permanent magnets positioned directly adjacent the coil. When a current is applied to the coil, a force is generated on the coil. By precisely controlling the current, positioning of the heads is achieved. The simplicity yet effectiveness of a voice coil comprising the coil of wires and the magnetic field makes such motors ideal for disk drives in terms of precise head positioning. However, the required orientation of the coils with respect to the magnets requires the actuator to have a somewhat elongated configuration to accommodate mounting of the coils to the yoke. Thus, the disk drive has a definable constraint in terms of size to account for the configuration of the actuator.

As disk drive technology continues to develop, there is a continuing need to provide reliable yet preferably smaller and less mechanically/electrically complex assemblies which enables manufacturers to more economically produce such drives.

While voice coil motors have proven to be effective for use in many disk drive applications, it would be advantageous to provide a motor to control actuator movement wherein part count and assembly complexity is reduced, yet standards of performance are maintained to handle the ever increasing track densities found on many data disks. Additionally, there is a need to provide such actuator control by use of a motor that is smaller in size, yet can handle the necessary torque requirements for precise actuator positioning.

SUMMARY OF THE INVENTION

In accordance with the present invention, a rotary actuator motor is provided that is integrated with the pivot bearing assembly. The motor of the present invention is considerably smaller than traditional voice coil motors, yet, the motor of the present invention reduces manufacturing part count, assembly complexity, and maintains acceptable performance standards.

In a first preferred embodiment of the present invention, the primary components of the rotary actuator motor comprise a magnet that is mounted on and moves with the pivot bearing of the actuator assembly, and a fixed coil that is positioned adjacent the bearing and aligned with the magnet. In this preferred embodiment, the magnet may be ring-shaped and selectively polarized to have the desired number of poles, four poles being one preferable option. The magnet is mounted on its corresponding co-rotating magnetic back plate or back iron, and the coil is on its corresponding magnetic back plate or back iron. The magnet fully encircles the pivot bearing which defines the actuator center of rotation. The arrangement of the magnet and coil in this fashion makes the rotary actuator motor of the present invention similar to an axial flux motor. In general terms, the motor of the present invention may still be referred to as a voice coil motor since a magnet and a series of coils are used to generate torque.

The coil of the present invention; however, distinguishes it from an axial flux motor. The coil is multi-stranded and may be arranged as a single loop or an array of loops connected in series. Further, the coil comprises a single phase and the angular pitch of the coil loops is similar to the angular pitch of the permanent magnet poles. As the coil is energized, a force acts on the current-carrying wires and an equal and opposite circumferential reaction force is generated on the magnet. Reversing the current results in a reversal of torque, thus providing bi-directional motion. The maximum stroke is determined by the angular pitch of the electro- and permanent magnet arrays. Torque linearity is assured, as in conventional voice coil motors, by limiting the motion to a fraction of the maximum stroke.

In a second embodiment of the present invention, instead of a coil mounted to a fixed magnetic back iron, the coil is mounted to a separate fixed bracket that encircles the pivot bearing, and the magnetic back iron associated with the coil is mounted on and moves with the pivot bearing. Accordingly, in this embodiment, the magnet and its corresponding magnetic back iron, as well as the magnetic back iron for the coil rotate as a unit, and the coil remains stationary. The primary advantage of this second embodiment is to eliminate problems associated with hysteresis effects. Hysteresis refers to the tendency of the magnetic back iron to become magnetized and create a parasitic drag on the rotating magnet. By allowing the magnetic back iron associated with the coil to rotate with the magnet, parasitic drag is substantially eliminated.

Most voice coil motors require two magnets in order to maintain the magnetic field perpendicular to the magnet plane. Failing to maintain this perpendicular or orthogonal arrangement results in generation of off-axis forces that can excite undesired resonance modes. Since the magnet of the present invention is symmetric about the center of rotation, off-axis forces are canceled, allowing pure in-plane torque to be delivered to the actuator.

Since the coil is stationary in the present invention, no dynamic electrical connections are required to power the coil. Rather, fixed electrical leads may be provided to the coil, which simplifies manufacturing and also reduces flex loop bias.

By incorporating the rotary actuator motor within the pivot bearing assembly, this design requires less space at the rear of the actuator. Accordingly, the disk drive can be made smaller for a given disk diameter when compared to drives which utilize traditional voice coil motors. Manufacturing costs can also be reduced since the overall part count for the motor is reduced.

In one aspect of the invention, it can be considered a motor or a means for controlling rotary movement of a device such as an actuator used in a disk drive. According to another aspect of the invention, with the integration of the actuator motor within the pivot bearing assembly, the invention can be considered a combination of the pivot bearing and actuator motor elements. In yet another aspect of the invention, the invention can be considered a method of controlling actuator movement in a disk drive wherein the motor components are integrated with the pivot bearing assembly.

Other features and advantages of the invention will become apparent from a review of the following detailed description taken in conjunction with the corresponding drawings.

DETAILED DESCRIPTION OF THE INVENTION

Figure 1:
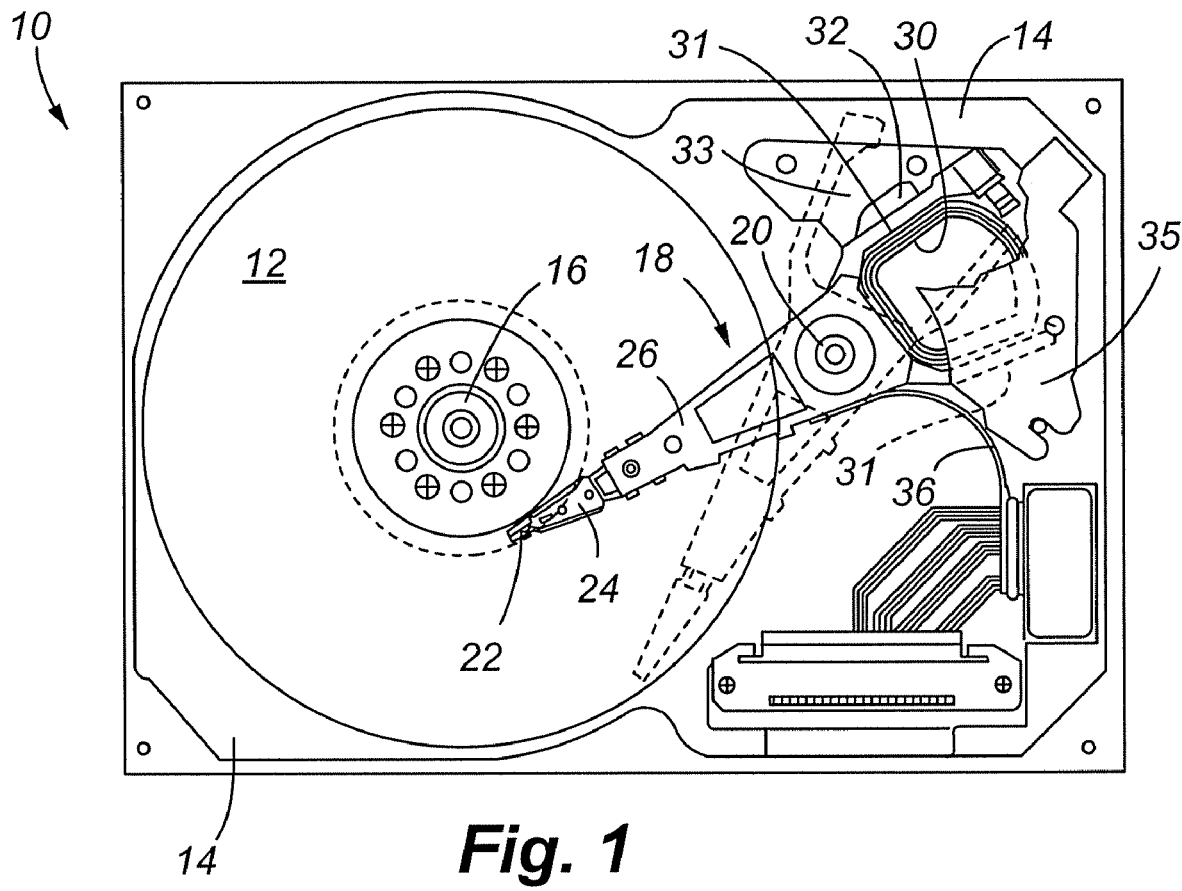
FIG. 1 is a simplified plan view of a prior art disk drive (top cover removed) illustrating basic components of the drive.

FIG. 1 shows a plan view of a disk drive assembly 10, with the top cover removed. FIG. 1 is representative of any number of common disk drives. The disk drive assembly as illustrated includes at least one disk 12, typically having magnetic media both on the upper and lower surfaces thereof. The disk 12 along with other components of the disk drive, are contained within the housing 14. The disk 12 is mounted over a hub 16 that is driven by a motor (not shown) enabling the disk to rotate at high rotational speeds during operation. An actuator assembly 18 is shown rotatably mounted to an actuator pivot bearing 20. Basic components of the actuator assembly 18 are shown as including one or more read/write heads 22 mounted on a flexure arm or suspension arm assembly 24. The suspension 24 is attached to actuator arm 26. The actuator assembly 18 is rotated to a desired disk track by a voice coil motor including voice coil 30. The voice coil 30 is typically mounted between the yokes 31 of the actuator assembly. The voice coil 30 is immersed in a magnetic field generated by a magnet assembly. The magnet assembly typically includes upper and lower magnets mounted to respective magnet plates. In FIG. 1, the upper magnet (not shown) and upper magnet plate 35 have been broken away thus exposing the lower magnet 32 and lower magnet plate 33. An actuator control circuit causes current flow in the voice coil 30, and ultimately controls the position of the actuator assembly 18 by varying current through the voice coil. FIG. 1 illustrates other common elements of a disk drive including a dynamic communications bus 36 that transfers electronic signals to and from the read/write heads 22.

Figure 2:
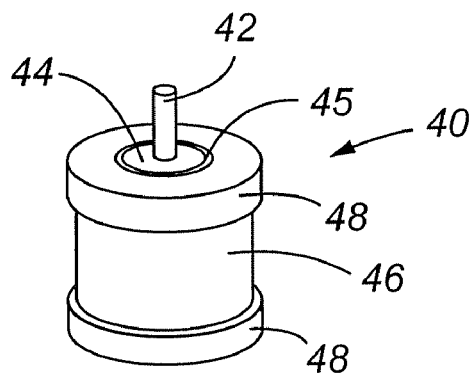
FIG. 2 is a perspective view of one example of a prior art pivot bearing.

Now referring to FIG. 2, a prior art pivot bearing 40 is illustrated. Typically, a pivot bearing includes a stationary mounting shaft or core 42 that has its upper end fixed to the top cover, and its lower end fixed to the base of the housing 14. The bearing further includes one or more inner races 44 which remain fixed to the mounting shaft 42, and corresponding outer races 46 which surround the inner races 44. A plurality of ball bearings (not shown) are positioned between the inner and outer races thereby allowing the outer race(s) to rotate about the inner race(s). Seals 45 are provided between the inner and outer races. Optionally, the bearing may include one or more outer flanges 48 which accommodate the particular configuration of the actuator bore which receives the bearing.

Figure 3:
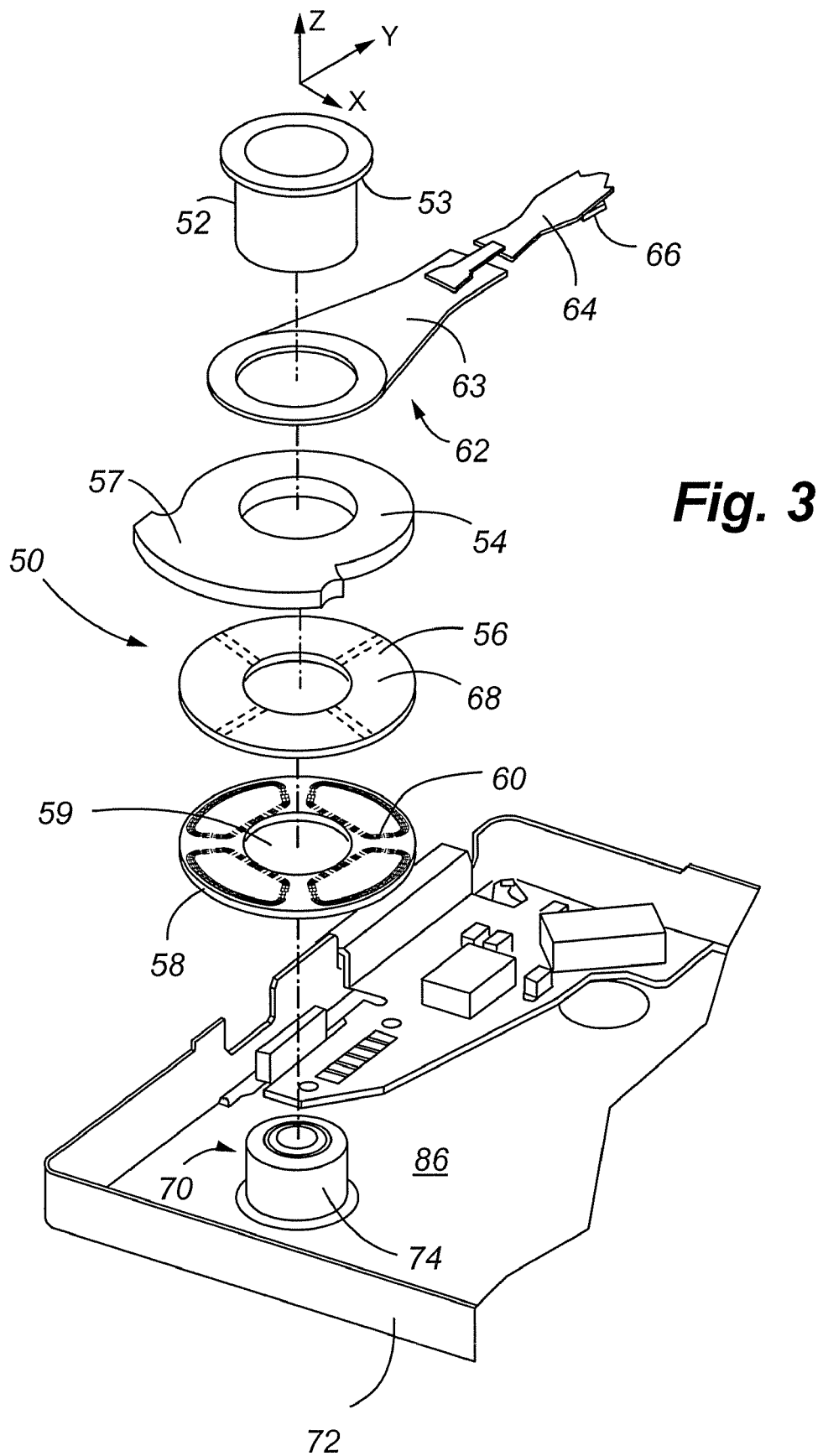
FIG. 3 is an exploded perspective view of the motor of the present invention along with other components of a disk drive including a pivot bearing and actuator assembly.

FIG. 3 illustrates a preferred embodiment of the motor of the present invention. Components of the motor in this figure are shown in an exploded view to show the manner in which the motor is configured with respect to the pivot bearing and the actuator assembly. The pivot bearing 70 is shown as protruding from the base 86 of the housing 72. As with the conventional prior art bearing shown in FIG. 2, the pivot bearing 70 may also include one or more inner and outer races with ball-bearings positioned in the gaps between the races, as illustrated and discussed further below with reference to FIG. 6. A lower fixed magnetic back plate or back iron 58 has a plurality of coil sections 60 mounted thereto. The coil sections 60 may be collectively referred to as the coil. The back iron 58 is positioned over the pivot bearing, but is secured to the base 86, and therefore remains stationary. A sleeve 52 is mounted over and in contact with the outer race 74 of the bearing. The sleeve 52 includes an upper flange 53 that limits the uppermost position for elements secured to the sleeve. According to the preferred embodiment of FIG. 3, the actuator assembly 62 is the most upper element secured to the sleeve. A magnet 56 is secured to an upper magnetic back plate or back iron 54. This upper back iron serves two functions: as a mounting for the magnet 56 and as a magnetic return path. Dotted lines 68 represent the separation in the respective poles of the magnet, four poles being illustrated in the figure. The upper back iron 54 and magnet 56 are disposed below the actuator assembly 62. The magnet, upper back iron, actuator assembly and sleeve all rotate together as a unit when the motor is in operation. The opening 59 of the fixed magnetic back iron 58 is larger than the outer diameter of the bearing 70 and sleeve 52; therefore, there is no interference between rotation of the bearing and the fixed back iron.

The upper back iron 54 includes an arcuate extension 57. This extension is provided as a counterweight to help offset the weight of the actuator arm 63, also thereby helping to balance rotation of the actuator about the pivot bearing in the x and y axes. The protrusion 57 may be sized and shaped to accommodate the particular weight and moment created by the actuator about the pivot bearing. In FIG. 3, the actuator assembly 62 represents any conventional actuator and includes a suspension 64 attached to the actuator arm 63, with one or more read/write heads 66 secured to the distal end of the suspension.

In lieu of the upper back iron 54 and magnet 56 disposed below the actuator arm, it is also contemplated that the upper back iron 54 with attached magnet 56 could be placed on top of the actuator 62, it being understood that operation of the motor can still be conducted so long as the magnet maintains a predetermined distance from the coil sections 60.

Figure 4:
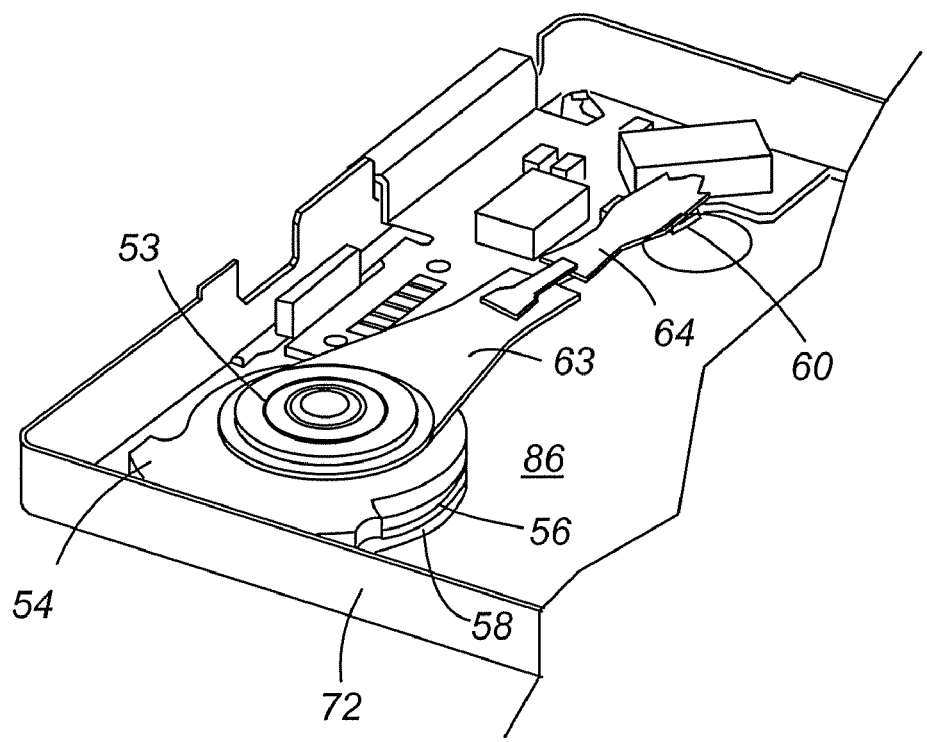
FIG. 4 is a perspective view illustrating the motor assembled with the pivot bearing and actuator assembly.

FIG. 4 illustrates the motor being assembled to the pivot bearing. Because of the relatively compact configuration of the motor, the actuator may be positioned much closer to the corner of the housing as shown in FIG. 4, thereby enabling the housing to be smaller in size. With traditional voice coils secured to yoke arms of an actuator assembly, these voice coils require a much greater offset between the edges of the housing and the location of the pivot bearing. Additionally, since the magnet 56 of the present invention is centered about the axis of rotation, this feature of the present invention also helps to minimize the size of the disk drive since the drive does not have to accommodate magnets and magnet back irons that also must be offset from the pivot bearing and axially oriented with the voice coil.

Figure 5:
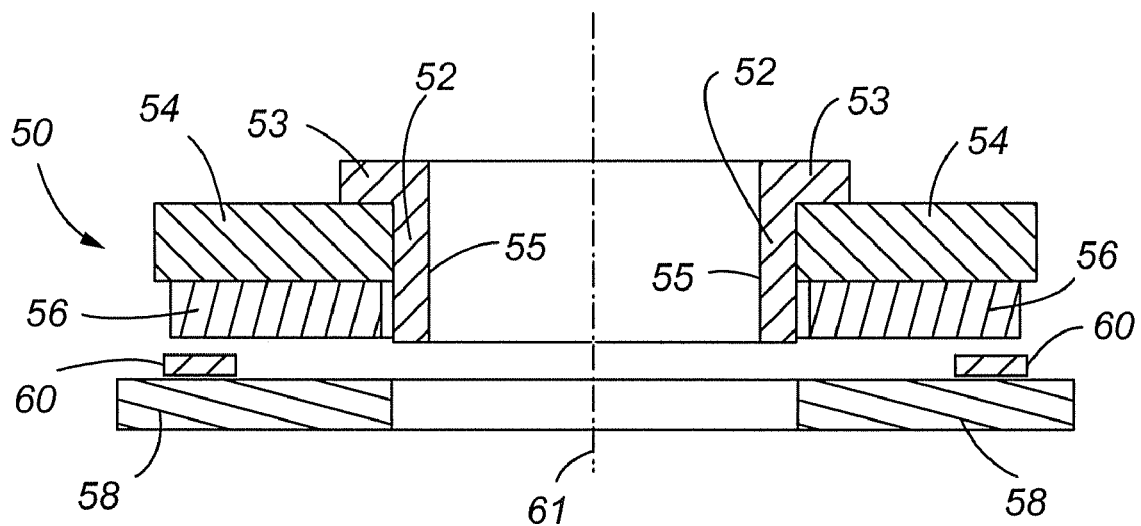
FIG. 5 is a simplified schematic and cross-sectional view of the basic components of the motor of the present invention.

FIG. 5 is a simplified schematic diagram of the motor of the present invention. As shown, the sleeve 52, upper back iron 54, and magnet 56 are assembled and spaced from the coil sections 60 that are secured to the lower fixed back iron 58. A center line 61 defines the central axis of rotation for a bearing secured to the inner surface of the sleeve.

Figure 6:
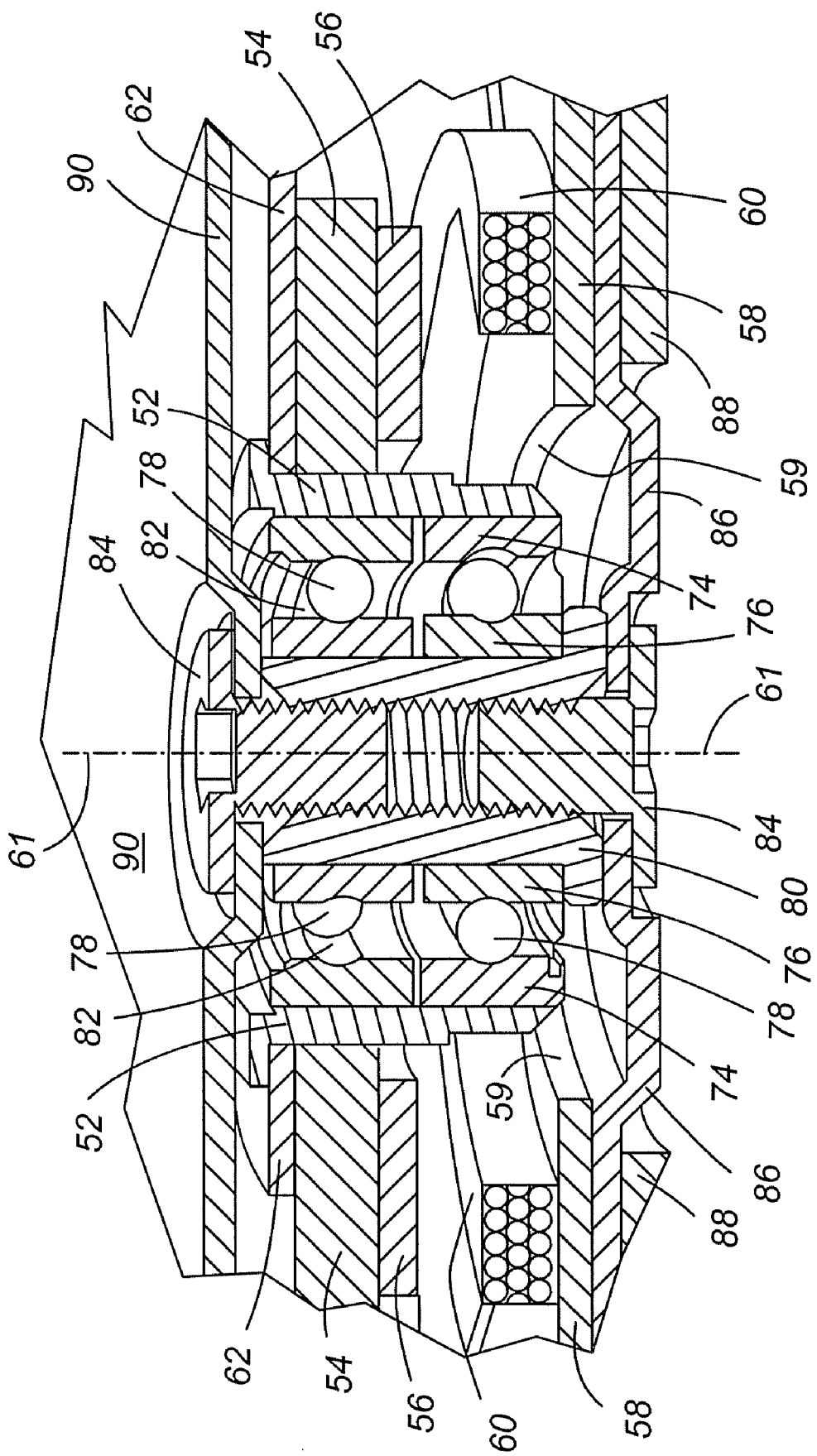
FIG. 6 is a vertical section of the motor of the present invention according to the embodiment of FIG. 3 illustrating further details of the motor components and the integration of these components with the pivot bearing.

FIG. 6 is a cross sectional view illustrating additional details of the motor of the present invention incorporated with a pivot bearing in accordance with the preferred embodiment of FIG. 3. FIG. 6 illustrates one example of a pivot bearing construction. The pivot bearing includes an inner race 76, an outer race 74, and a plurality of ball bearings 78 positioned between the races within respective bearing raceways 82. Sleeve 52 is mounted over and in contact with the outer race 74. The inner race 76 is mounted to a stationary shaft 80. The shaft 80 is held in place by a pair of securing screws 84, one extending through the top cover 90 of the housing, and the other extending through the base of the housing 86 that is secured to the PCB 88. As also shown, the inner peripheral surface 59 of the fixed lower back iron 58 is spaced from the outer race of the bearing so as to prevent contact therewith. The coil sections 60 are disposed on the upper surface of the fixed lower back iron 58. Accordingly, the magnet 56 and coil sections 60 are placed in facing positions. An electrical current applied to the coil sections 60 causes a torque reaction, and accordingly, the outer race, sleeve, magnet, upper magnetic back plate, and actuator rotate as a single unit.

Figure 7:
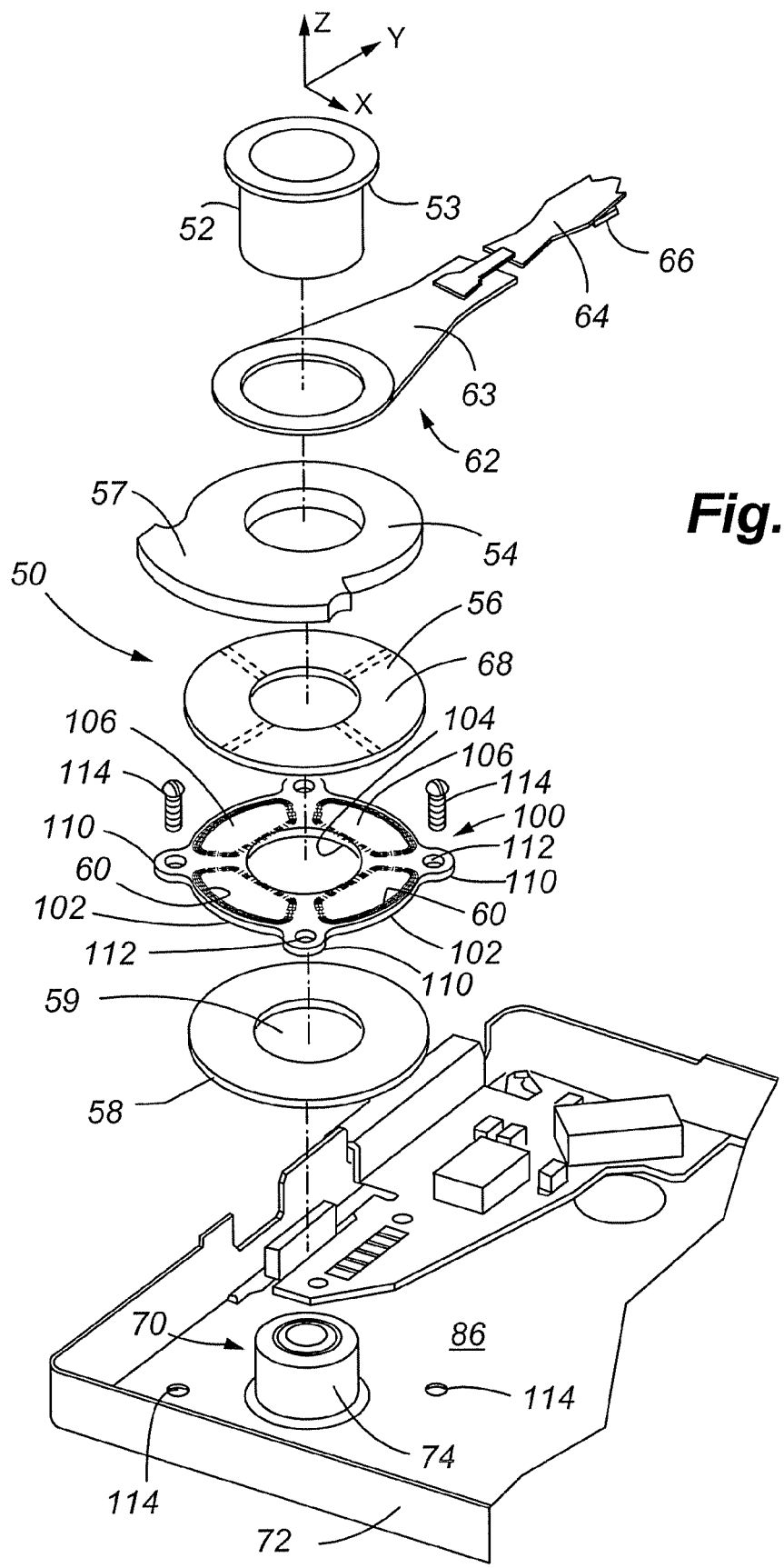
FIG. 7 is an exploded perspective view of the motor of the present invention in a second embodiment.
Figure 8:
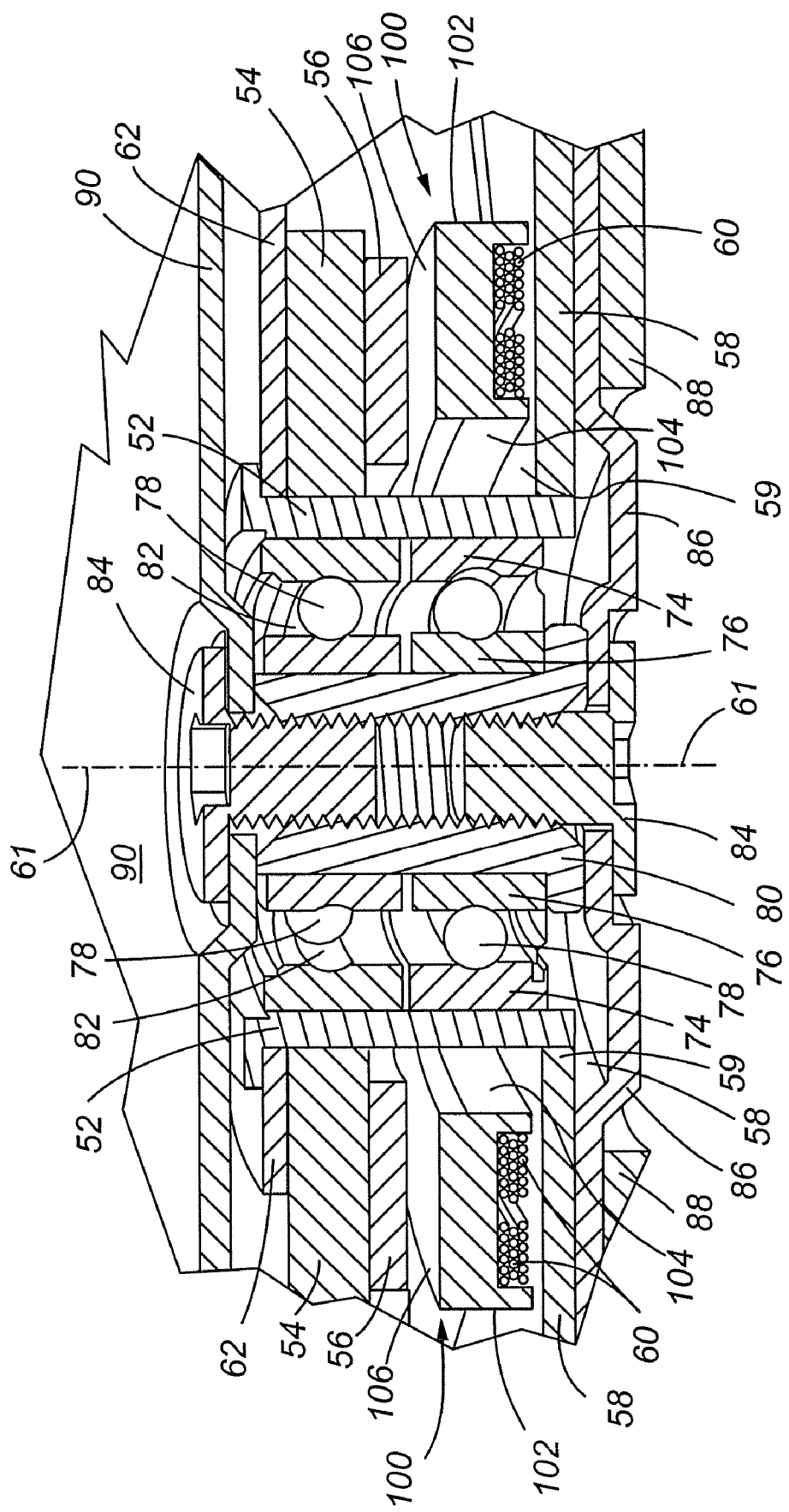
FIG. 8 is a vertical section of the motor illustrated in FIG. 7.
Figure 11:
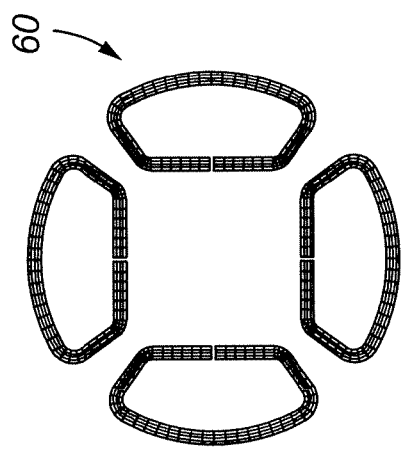
FIGS. 9-14 illustrate exemplary coil configurations that are suitable for use with the motor of the present invention.
Figure 14:
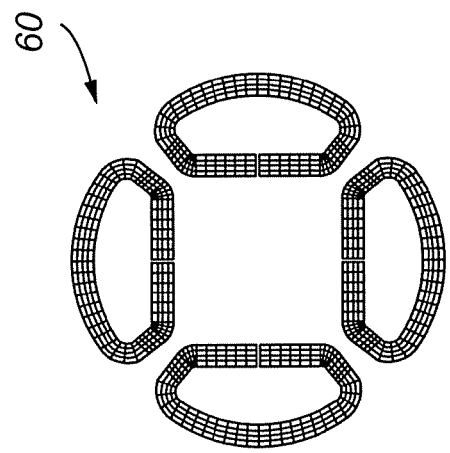
Figure 10:
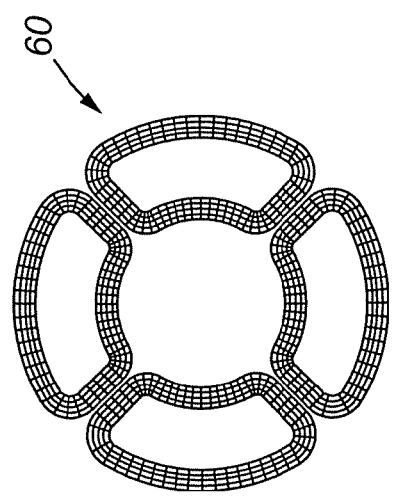
Figure 13:
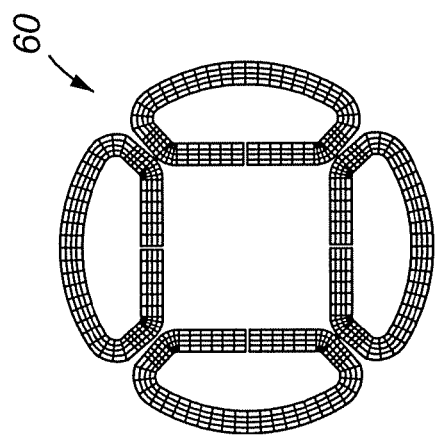
Figure 9:
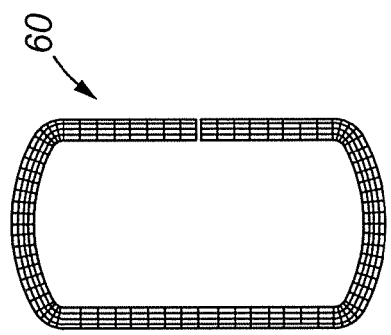
Figure 12:
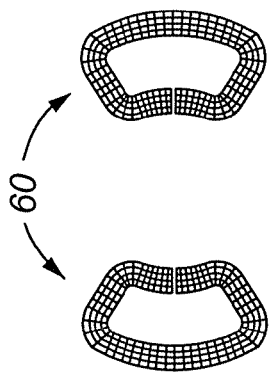

FIGS. 7 and 8 illustrate the motor of the present invention in a second embodiment. In this second embodiment, the lower fixed magnetic back plate or back iron 58 is mounted to the sleeve 52, while the coil sections 60 are mounted separately to a bracket assembly 100 which is positioned in a gap between the magnet 56 and the lower back iron 58. The bracket assembly 100 comprises an outer periphery 102, an inner periphery 104, and a body portion 106 that secures the various coil sections 60. The body portion 106 can be a planar ring shaped member that interconnects the inner 104 and outer 102 peripheries, or the body portion 106 can be uniquely shaped to follow the particular coil pattern used.

Referring specifically to FIG. 8, the bracket assembly is shown as extending in the gap between the magnet 56 and the lower back iron 58, but not in contact with the lower back iron or the magnet. Preferably, the bracket assembly 100 is non-metallic, and should be made of a non-magnetic material. For example, the bracket assembly 100 could be made from a thermoplastic material formed in injection molding. The coil sections 60 could be placed within a mold, and then an injection molding process could take place to form the bracket assembly around the coil pattern. As also shown, the bracket assembly 100 comprises a plurality of mounting flanges 110 formed on the periphery of the bracket assembly. Each mounting flange includes a screw hole 112. Screws 114 are used to secure the bracket assembly 100 in screw holes 116 formed in the base plate of the disk drive housing. Accordingly, the bracket assembly 100 suspends the coil sections 60 in the position as shown in FIG. 8.

The inner periphery 104 of the bracket assembly 100 is spaced from the sleeve 52 surrounding the outer race of the bearing. Thus, the magnet 56, upper back iron 54, and lower back iron 58 are able to freely rotate with the bearing and without any contact with the bracket assembly 100 or the coil sections 60. FIG. 8 shows the coil sections 60 placed in a slot or channel formed between outer periphery 102 and inner periphery 104. However, the coil sections 60 can be secured to the bracket assembly 100 in other ways, such as securing the coil sections to the upper surface of the body portion 106, as shown in FIG. 7. As discussed above, this embodiment is particularly advantageous in eliminating hysteresis effects.

Referring to FIGS. 9-14, various coil patterns are illustrated. A controlled current applied to the coil sections along with their particular arrangement and spatial relationship with the magnet determines the incremental torque forces created to control rotary positioning of the actuator. As mentioned above, a four-pole magnet is advantageous for use with any one of the coil arrangements shown in FIGS. 9-14. Those skilled in the art can envision other coil arrangements and magnetic pole arrangements that may be suitable for producing desired incremental forces in order to precisely control the actuator assembly.

With respect to the second embodiment, the body portion 106 of the bracket assembly 100 may be shaped to accommodate any of the coil arrangements shown in FIGS. 9-14. Because the bracket assembly may be formed in an injection molding process, great flexibility is provided in implementing the second embodiment without substantial manufacturing cost.

Unlike typical disk drive actuators that are driven by moving coils placed in a stationary magnetic field, the invention described herein is of a design that is especially adapted for low inertia actuators. The coil sections of the present invention are stationary while the magnet moves. The magnet may be ring-shaped and may be polarized with a desired number of poles. Since the magnet of the present invention is symmetric about the center of rotation, off-axis forces are canceled, and pure in-plane torque can be delivered to the actuator. Since the coil sections are stationary, no dynamic electrical connections are required to power the coil sections. Accordingly, power input design is greatly simplified. The construction of the motor simplifies assembly of the disk drive and reduces overall disk drive part count, thus manufacturability is enhanced. Clearly, less space is required in the housing of the disk drive; therefore, the disk drive can be made smaller.

While the present invention has been set forth above with respect to preferred embodiments in both an apparatus and method, it shall be understood that other changes and modifications can be made within the spirit and scope of the invention commensurate with the scope of the claims appended hereto.

What is claimed is:

1. An apparatus comprising:
    a bearing having an inner race and an outer race, said outer race being rotatable about said inner race;
    a sleeve mounted over said outer race;
    a rotatable asymmetric upper back iron mounted over the sleeve, the upper back iron having an arcuate extension that balances an actuator motor;
    a magnet contactingly secured to the rotatable upper back iron and symmetrically secured about the sleeve;
    a lower fixed back iron mounted adjacent said bearing so that the bearing protrudes through an aperture in the fixed back iron;
    a coil secured to said lower back iron, said coil being longitudinally aligned with said magnet; and wherein a selected voltage and amperage applied to said coil causes rotation of said magnet with respect to said coil, and in turn results in said rotation of said outer race about said inner race.

2. The apparatus of claim 1, wherein the asymmetric upper back iron conducts magnetic flux as a magnetic return path and accommodates a predetermined moment about a pivot bearing.

3. The apparatus of claim 1, wherein said coil comprises at least one closed loop of electrically conductive material arranged about an axis of rotation.

4. The apparatus of claim 1, wherein the arcuate extension protrudes less than a circumferential distance about the upper back iron.

5. The apparatus of claim 1, wherein said magnet is disposed directly above and spaced from said coil, said magnet and said coil being aligned with respect to a central axis extending through said magnet and said coil.

6. The apparatus of claim 1, wherein said lower back iron and said upper back iron are each substantially planar and each extend orthogonal with respect to a central axis of said motor.

* * * * *